United States Patent [19]

Blais

[11] Patent Number: 4,542,522
[45] Date of Patent: Sep. 17, 1985

[54] AN X-RAY FILM CASSETTE HOLDER

[76] Inventor: Gilbert L. Blais, 544 Cherrington Rd., Westerville, Ohio 43081

[21] Appl. No.: 559,159

[22] Filed: Dec. 7, 1983

[51] Int. Cl.[4] .................. G01M 21/00; H05G 1/62; A47F 7/16; A47F 5/12
[52] U.S. Cl. .................................. 378/167; 211/47; 211/85; 211/173; 248/149; 248/150; 248/157; 378/181
[58] Field of Search ............... 378/167, 177, 179, 181; 211/47, 85, 173; 248/149, 150, 157; 250/491.1; 354/62

[56] References Cited

U.S. PATENT DOCUMENTS 2,677,518  5/1954  Happy et al. .................. 248/150
2,919,873  1/1960  Tice ............................... 378/181
3,705,984  12/1972  Westenberger ................. 378/181

Primary Examiner—Richard L. Schilling

[57] ABSTRACT

An X-ray film cassette holder for use in X-raying injuries to large animals in the field, especially race horses, and especially adapted to knee and ankle X-ray procedures.

4 Claims, 5 Drawing Figures

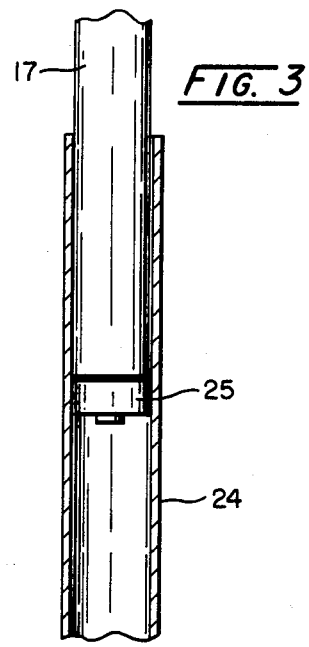
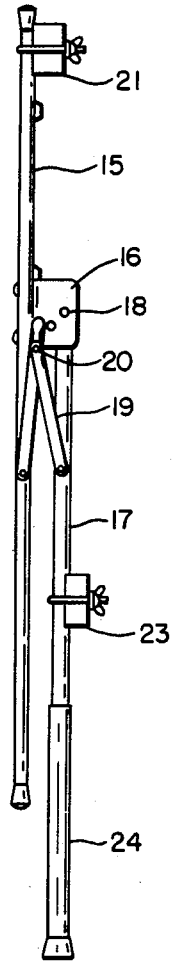
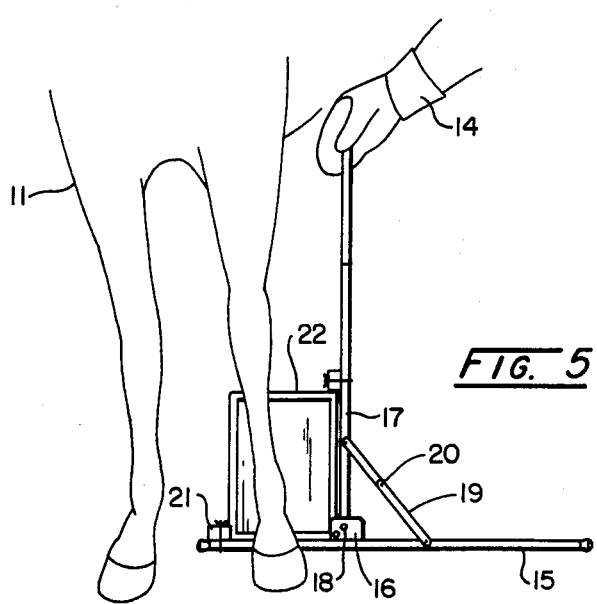

AN X-RAY FILM CASSETTE HOLDER

BACKGROUND OF THE INVENTION

For veterinarians in diagnosing injuries to large animals, in the field, especially race horses, it is important that the X-ray plate be held in a reasonably immobilized position for approximately one-twenty-fifth to one-tenth second while the X-ray camera is being used.

While this can readily be done with large animals that are hospitalized or anesthesized, for early diagnosis in the field the animal may merely be held in a standing, upright position. Over 90 percent of the X-rays taken of large animals under these conditions are X-rays of injuries to the knee or ankle of the animal.

Usually the animal, especially in the case of race horses, is tempermental, does not wish to maintain a quiet, fixed position for a very long period of time and can injure anyone who is holding the X-ray film.

It is the current practice in the field for a technician or veterinarian's assistant to hold the film behind the portion of the animal to be X-rayed in order to maintain the X-ray film in a reasonably static condition during exposure. In the case of a race horse, this presents two dangers: (1) that the assistant will be subject to being kicked or trampled on by the race horse, and (2) subject the technician to unnecessary exposure to X radiation.

SUMMARY OF THE INVENTION

The subject invention is adapted to hold an X-ray cassette at a preselected height above the ground so as to enable it to be used either for an examination of the knee or ankle of a large animal, and also to permit the veterinary's assistant who is holding the cassette to be sufficiently out of the line of the X radiation from the X-ray machine and also to be reasonably safely spaced from the large animal so as not to be hurt if the animal should suddenly kick or otherwise move.

It is therefore an object of this invention to provide a portable, collapsible X-ray cassette holder which may be adjusted to proper height in order to be positioned for an X-ray photograph of a large animal's knee or ankle injury.

It is another object of this invention to provide such an X-ray film cassette holder in which the cassette may be easily and quickly inserted in the field and which holder may be quickly and easily modified for positioning with respect to the large animal's knee or ankle.

These, together with other objects and advantages of the invention, should become apparent in the details of construction and operation as more fully described herein and claimed, reference being had to the accompanying drawings forming a part hereof wherein like numerals refer to like parts throughout.

BRIEF DESCRIPTION OF THE DRAWINGS

FIG. 3 is a detail of an adjustable arm in applicant's invention.

FIG. 4 is a side elevation view of applicant's invention in folded transport position.

FIG. 5 is a view of applicant's invention showing it in use for an X-ray photograph of a large animal's ankle.

DETAILED DESCRIPTION OF THE INVENTION

Figure 1:
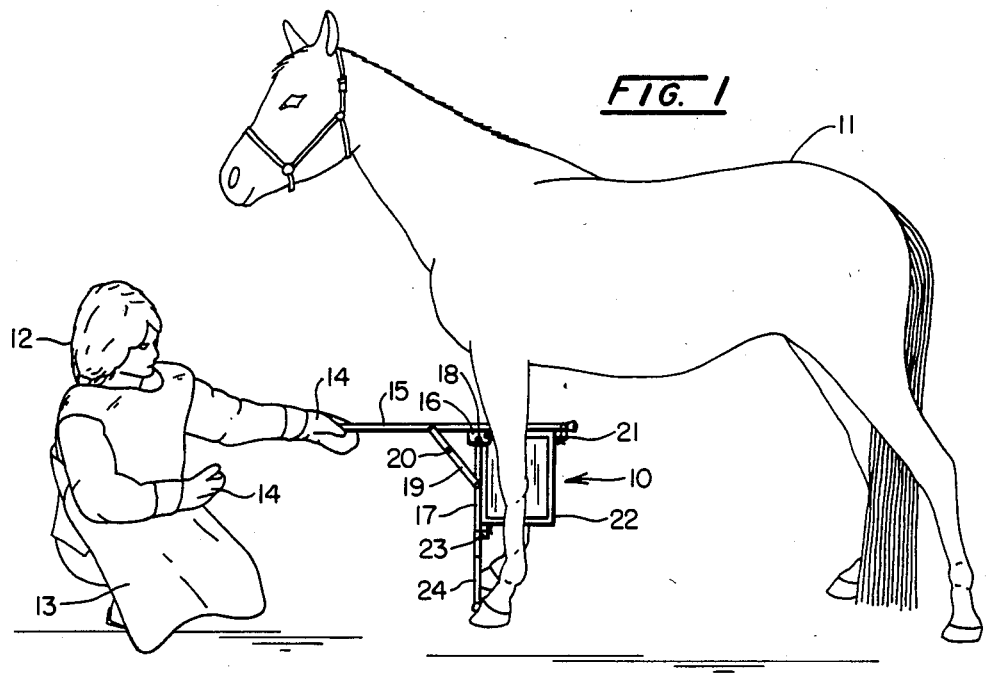
FIG. 1 is a side elevation view of applicant's invention shown in use being held for an X-ray photograph of a race horse's knee with the attendant properly positioned so as to have minimal exposure to the X radiation.

Referring now more particularly to FIG. 1, applicant's invention is shown generally at 10 positioned behind the knee of a race horse 11 held by a technician 12 protected by a leather apron 13 and leather gloves 14—14 as a guard against radiation damage.

Figure 2:
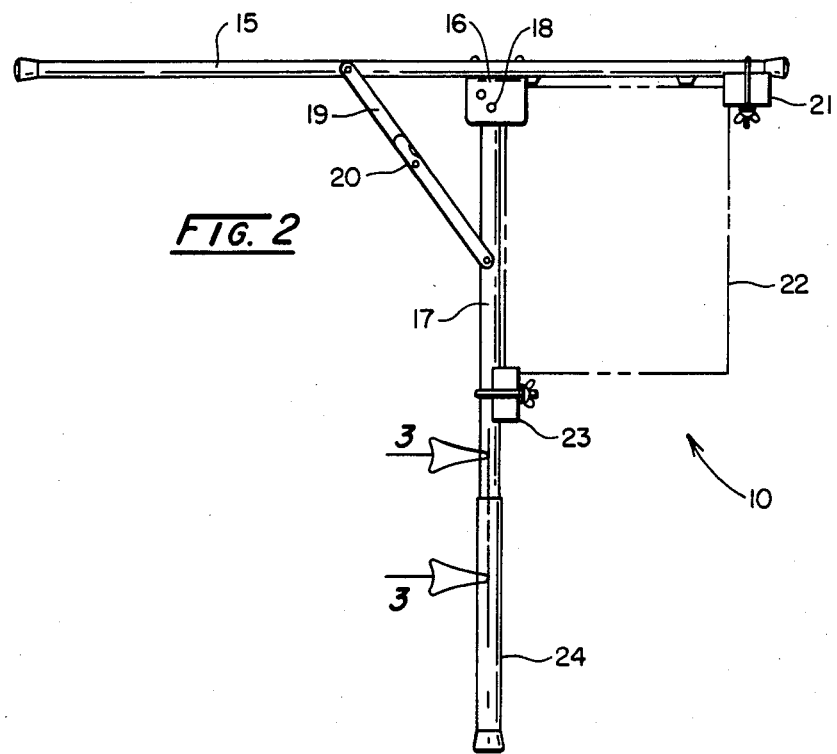
FIG. 2 is a side elevation view of the invention shown in FIG. 1.

Referring now more particularly to FIG. 2, applicant's invention is shown generally at 10, and comprises an arm 15, provided with a cassette receiving section 16 involving arm 17 fulcrumed at 18 and rigidly held at right angles to the arm 15 by means of brace 19 hinged at 20. Arm 15 is provided with a resilient member 21 concave in cross section to receive an X-ray cassette 22. Arm 17 is provided with a comparable member 23 also resilient and concave so as to receive the opposite corner of X-ray cassette 22. Arm 17 has an extension member 24 which may be adjusted to vary the total length of arm 17 and member 24.

Referring now more particularly to FIG. 3, member 17 fits into member 24 and is provided with an off-center cylindrical portion 25 so that rotation of arm 24 will cause frictional engagement with portion 25 thus permitting an unlimited variation in the length of the combination of arm 17 and member 24.

Referring now more particularly to FIG. 4, it will be seen that applicant's X-ray cassette holder may be readily stowed for storage and is shown in a collapsed position.

Referring now more particularly to FIG. 5, applicant's invention is shown in position for ankle X-ray of a large animal's leg. The handler's 12 gloved hand 14 is shown holding arm 17 which in this case is positioned vertically upward and arm 15 is resting on the ground behind the animal's foreleg so that the X-ray cassette 22 is positioned properly.

In use, as shown in FIG. 1, the animal is usually held by a handler positioned forward of the animal. The technician 12 then may position the X-ray cassette holder 10 behind the knee of the animal 11 adjusting the length of legs 17 and 24 by means of the off-center cylindrical member 25. Once the proper height has been achieved, the technician 12 may be so positioned so that if the animal moves the technician is not endangered and when the X-ray camera is activated the technician is adequately protected.

Likewise in FIG. 5, with the device inverted, the film may be positioned behind the animal's ankle, now only in the position shown but at other angles as desired by the attending veterinarian.

In use, as in FIG. 1, the arm 15 may be laid against the inside foreleg of the animal so as to provide a three point steadying position. While this is not as important in the position shown in FIG. 5, it can also be done in that position of the invention. In either case, if the animal should move quickly or should kick, the X-ray cassette holder may be quickly pulled out of the way so as to avoid damage either to the technician 12, the holder 10, or the X-ray cassette 22.

While this invention has been described in its preferred embodiment, it is appreciated that variations thereon may be made without departing from the scope and spirit of the invention.

What is claimed is:

1. An X-ray cassette holder for use in examining the leg injuries of large animals comprising
   a first member adapted to receive two corners of said cassette,
   a second member hingedly connected to said first member and adapted to receive one of the corners of said cassette held by said first member and an adjacent corner of said cassette,
   means adjustable to position said first and second members in essentially parallel relationship and alternatively to position them at right angles to one another,
   means for temporarily fixedly securing sand first and second members at right angles to one another, and
   means to adjust the length of said second member.

2. An X-ray cassette holder for use in examining the leg injuries of large animals comprising
   a first member adapted to receive two corners of said cassette,
   a second member hingedly connected to said first member and adapted to receive one of the corners of said cassette held by said first member and an adjacent corner of said cassette,
   the portions of said first and second members adapted to receive the corners of said cassette being made of a semi-elastic material provided with concave recesses adapted to engage and firmly hold said cassette,
   means adjustably to position said first and second members in essentially parallel relationship and alternatively to position them at right angles to one another, and
   means to adjust the length of said second member.

3. The X-ray cassette holder of claim 1 wherein said means for adjusting the length of said second member comprises a cylinder attached to said second member and axially spaced therefrom.

4. The X-ray cassette holder of claim 1 wherein said means for adjustably positioning said first and second members in parallel relationship and at right angles to one another comprises a hinged collapsible arm.

* * * * *

UNITED STATES PATENT AND TRADEMARK OFFICE
CERTIFICATE OF CORRECTION

PATENT NO. : 4,542,522

DATED : September 17, 1985

INVENTOR(S) : Gilbert L. Blais

It is certified that error appears in the above-identified patent and that said Letters Patent are hereby corrected as shown below:

In the Claims:

Claim 1, line 13, change the word "sand" to "said."

Signed and Sealed this

Seventh Day of January 1986

[SEAL]

Attest:

DONALD J. QUIGG

Attesting Officer

Commissioner of Patents and Trademarks